Patented June 29, 1948

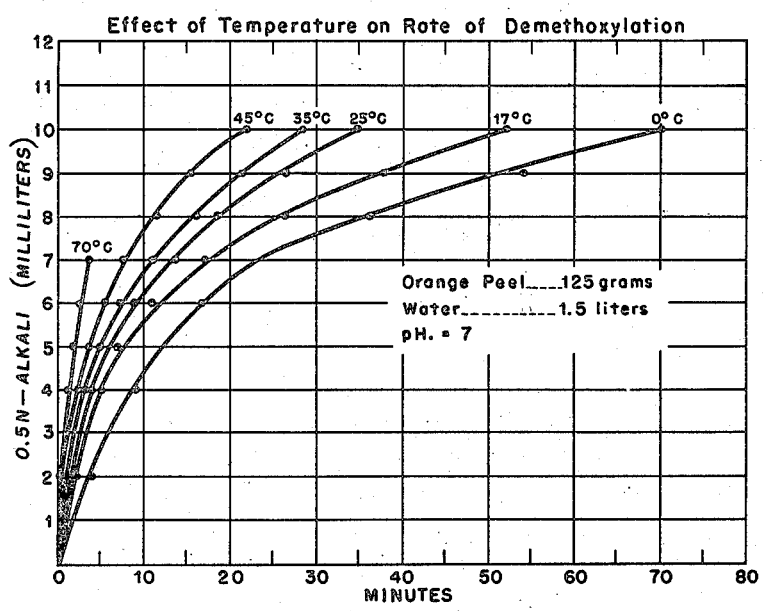
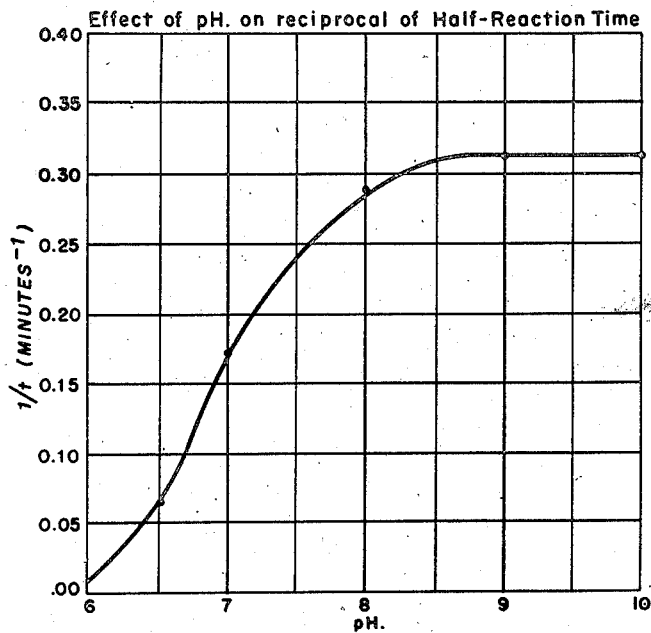
Inventors
H. C. OWENS
W. D. MACLAY

2,444,266

UNITED STATES PATENT OFFICE 2,444,266

PECTIC MATERIALS AND METHOD OF PREPARING SAME

Harry S. Owens and William Dayton Maclay, Berkeley, Calif., assignors to the United States of America as represented by the Secretary of Agriculture Application March 31, 1944, Serial No. 529,016

4 Claims. (Cl. 195—30)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

This invention relates to pectic materials and has among its objects the provision of a process for preparing a series of partially demethoxylated pectins (pectinic acids) of high molecular weight.

We have found that a series of pectic materials of varying methoxyl content and of high molecular weight can be prepared from citrus peel or apple pomace (e. g., citrus peel or apple pomace which has not been subjected to treatment such as to inactivate the enzyme content), or from mixtures of citrus peel or apple pomace with other pectin-containing materials or with pectin, by adjusting the pH of the reaction mixture so as to obtain active enzymic action of the pectin-esterase present in the citrus peel or apple pomace, and then extracting the resulting pectic materials at an acidic pH in the presence of a calcium complex-forming agent according to the process described by Maclay and Nielsen in their application for patent Serial No. 529,015, filed March 31, 1944, now Patent 2,375,376.

Our process comprises forming an aqueous slurry of: (1) dispersed citrus peel or apple pomace or a newly-made aqueous extract of disintegrated citrus peel; (2) a mixture of a pectin-containing material and dispersed citrus peel or apple pomace; (3) a mixture of pectin and dispersed citrus peel or apple pomace; or (4) a mixture of a newly-made aqueous extract of disintegrated citrus peel and pectin or a pectin-containing material. This aqueous slurry is then adjusted to a temperature within the range 0° to 60° C., preferably below 45° C., and sufficient sodium hydroxide solution is added to bring the reaction mixture to a pH of 6 to 10, preferably 8 to 10. Under these conditions, the pectin-esterase present in the citrus peel or apple pomace demethoxylates the pectin present, either in situ or as free pectin, in the reaction mixture. The addition of alkali is continued at a rate which will maintain the proper pH until the amount of alkali necessary to yield a pectinic acid of the desired methoxyl content has been added. The dispersion is then rapidly acidified to a pH of about 3 with a strong acid, and may be heated to boiling to destroy the catalysts present. The pulp which is obtained at this point in the process may be pressed or filtered and dried for storing, if desired.

The extraction is accomplished by adding about 0.5 percent of sodium hexametaphosphate to the blanched dispersion and heating at boiling temperature for about 10 to 30 minutes. Recovery is effected by filtering the extraction mixture, and isolating the pectinic acid in the usual manner. The resulting products are very fibrous in nature and their solutions exhibit very high viscosities.

Our invention is illustrated by the following examples:

EXAMPLE I

To 500 g. of finely disintegrated fresh orange peel dispersed in 1500 ml. of water at 25° C., 11 ml. of 2N-sodium hydroxide was added to adjust the pH of the mixture to 8. The pH was kept at that value for 4.8 minutes by gradual addition of 40 ml. of 0.5N-sodium hydroxide. The dispersion was then rapidly acidified to a pH of 3 by addition of 18N-sulfuric acid, and quickly heated to boiling to destroy the catalysts present. At this stage the pulp may be filtered, dried and stored, if desired. The extraction was accomplished by adding 6 g. of sodium hexametaphosphate to the blanched dispersion (the addition would be made to redispersed pulp if it had been stored after the processing above), and heating to boiling for 15 minutes. The dispersion was then filtered and the liquor was poured into 1 volume of 95 percent ethanol. The pectinic acid was filtered, hardened in alcohol, dried and ground. Yield: 9.5 g. or 10.5 percent on basis of dried weight of peel. Methoxyl content: 3.1 percent.

EXAMPLE II 1 kilogram of fresh lemon peel was ground and dispersed in 3500 ml. of water at 25° C. 60 ml. of 2N-alkali was added to adjust the pH to 8, followed by the continuous addition of 90 ml. of 0.5N-alkali during 6.5 minutes. The demethoxylation reaction was stopped by addition of 18N-sulfuric acid to lower the pH of the reaction mixture to 3. The dispersion was then heated to boiling, 6 g. of sodium hexametaphosphate was added and the mixture was boiled for 15 minutes. The pulp was filtered and the liquor was poured into 2 volumes of alcohol. The pectinic acid was hardened in alcohol, dried and ground. Yield: 23 g. or 13.2 percent on basis of dried weight of peel. Methoxyl content: 4.5 percent.

EXAMPLE III 1 kilogram of fresh grapefruit peel was disintegrated in 5 liters of water at 24.5° C. 24 ml. of 2N-alkali was added to adjust the pH to 8. An additional 16 ml. of 2N-alkali was added during a period of 2.6 minutes to neutralize the acidic groups formed by virtue of partial demethoxylation of the pectic material. The dispersion was acidified with 1:1 sulfuric acid to a pH of 3 and heated to boiling. 15 g. of sodium hexametaphosphate was added and the extraction was continued for 15 minutes at boiling temperature. Yield: 16 g. or 9 percent on the basis of dried weight of peel. Methoxyl content: 5.5 percent.

EXAMPLE IV 500 g. of apple pomace was disintegrated in 2 liters of water at 25° C. The pH was adjusted to 8 with 2N-alkali. An additional 28 ml. of 0.5N-alkali was added in 21.7 minutes to neutralize the deesterified acid groups. The slurry was then acidified to pH 3 by the addition of 1:1 sulfuric acid and heated to boiling, and 6 g. of Calgon was added. The extraction was continued for 15 minutes. Yield: 5 g. or 4 percent on the basis of total solids. Methoxyl content: 3.2 percent.

EXAMPLE V

A mixture of 100 g. of dried apple pomace and 100 g. of fresh orange peel was ground in 2500 ml. of water at 25° C., and the pH was adjusted to 9 by rapid addition of 2N-alkali, and the dispersion was maintained at that pH by the addition of 30 ml. of 0.5N-alkali during a period of 13.5 minutes. The reaction mixture was then acidified to a pH of 3 and heated to boiling. 6 g. of sodium hexametaphosphate was added and the mixture was boiled for 15 minutes. The pulp was then filtered off and the liquor was precipitated in two volumes of alcohol. The precipitate was hardened in alcohol, and then dried and ground. Yield: 10.5 g. or 9.4 percent on basis of dried weight of pomace and peel. Methoxyl content: 3.0 percent.

EXAMPLE VI 6 g. of apple pectin having a methoxyl content of 6 percent and 250 g. of ground fresh orange peel were mixed in 1500 ml. of water at 25° C. The mixture was adjusted to a pH of 8 by the addition of 22 ml. of 0.5N-sodium hydroxide. Sufficient additional alkali was added to deesterify one-half of the calculated quantity of methoxyl groups present. The dispersion was then acidified to a pH of 3, 3 g. of sodium hexametaphosphate was added, and extraction was carried out at boiling temperature for 15 minutes. The pulp obtained was filtered and the resulting liquor was precipitated with alcohol. The pectinic acid recovered was hardened in alcohol, and then dried and ground. The methoxyl content was 3.9 percent as compared to a calculated value of 3.7 percent.

EXAMPLE VII

To 100 g. of thinly sliced lemon peel suspended in 600 ml. of water was added 50 ml. of 0.5N ammonium hydroxide to adjust the pH to 8.4. An additional 100 ml. of 0.5N ammonium hydroxide was added during a period of 20 minutes. The pulp was then pressed and dried. Nitrogen content of product was 2.2 percent.

The proper reaction conditions for carrying out our process are indicated by the following data:

TABLE I

*Effect of temperature on rate of demethoxylation* [1]

| Ml. of 0.5 N-Alkali | Rate of consumption of alkali in minutes at— | | | | |
| --- | --- | --- | --- | --- | --- |
|  | 0° C. | 17° C. | 25° C. | 35° C. | 45° C. |
| 2 | 3.7 | 1.5 | 1.1 | 0.8 | 0.9 |
| 4 | 8.5 | 4.0 | 2.9 | 2.7 | 2.5 |
| 6 | 16.1 | 10.6 | 8.0 | 6.3 | 6.0 |
| 8 | 36.2 | 26.3 | 18.4 | 13.5 | 11.1 |
| 10 | 70.0 | 52.0 | 34.8 | 27.7 | 21.3 |

[1] As measured by the rate of consumption of alkali by 125 g. of disintegrated orange peel in 1500 ml. of water at a pH of 7.

The information shown in Table I is plotted in Figure 1 to illustrate the rapidity of the reaction. Half-reaction time, calculated on the basis of average yields and average methoxyl content of pectin isolated from orange peel, is obtained when 8.8 ml. of 0.5N-alkali is added. An additional curve for a reaction temperature of 70° C. is plotted in Figure 1 to show that the reaction apparently stops at this temperature because of denaturation of the enzyme. As indicated by Table I, however, the reaction can be carried out at any temperature from 0° to 45° C. without difficulty. The upper practical limit has been found to be about 60° C.

TABLE II

*Effect of pH on rate of demethoxylation* [1]

| Ml. of 0.5 N-alkali | Rate of consumption of alkali in minutes at— | | | | | |
| --- | --- | --- | --- | --- | --- | --- |
|  | pH 6.0 | pH 6.5 | pH 7.0 | pH 8.0 | pH 9.0 | pH 10.0 |
| 10 | 10.1 | 2.0 | 0.8 | 0.7 | 0.6 | 0.3 |
| 20 | 45 | 4.8 | 2.3 | 1.8 | 1.4 | 1.0 |
| 30 | 101 | 10.1 | 4.2 | 2.8 | 2.4 | 2.2 |
| 40 [2] |  | 29.5 | 8.0 | 4.8 | 3.9 | 4.0 |

[1] As measured by the rate of consumption of alkali by 500 g. of orange peel in 1500 ml. of water at 25° C.
[2] 35 ml. alkali is approximately equivalent to 50 percent demethoxylation.

Table II, together with Figure 2 which shows the effect of pH on half-reaction time, emphasizes the importance of high pH values in obtaining maximum rates of reaction.

In addition, a comparison of the rate of consumption of 10 ml. of alkali in Tables I and II at 25° C. and a pH of 7 indicates that the rate of reaction increases as the concentration of pectin-containing material in the aqueous slurry increases. It has also been found that citrus peel disintegrated to a fine dispersion in a Waring blender reacts at a rate appreciably greater than like peel ground in a meat grinder.

The rate of demethoxylation is also increased by the addition of sodium hexametaphosphate to the reaction mixture. Thus, a mixture of 400 g. of blanched orange peel, 100 g. of fresh orange peel, and 2000 ml. of water adjusted to a pH of 8 required 18 minutes for the addition of 40 ml. of 0.5N-alkali. When 3 g. of sodium hexametaphosphate was added, however, only 12 minutes was required, and when 6 g. of the salt was added the reaction time was reduced to 8 minutes.

TABLE III

*Effect of source of fruit on rate of demethoxylation*

| Ml. of 0.5 N-Alkali | Peel | | | Apple Pomace min. |
|---|---|---|---|---|
| | Grapefruit min. | Lemon min. | Orange min. | |
| 2 | 1.2 | 1.5 | 1.1 | 27.2 |
| 4 | 2.7 | 3.7 | 2.9 | 130 |
| 5 | 4.0 | 5.6 | 4.7 | |
| 6 | 5.4 | 7.4 | 8.0 | |
| 7 | 6.7 | 9.6 | 12.6 | |
| 8 | 8.6 | 12.3 | 18.4 | |
| 9 | 10.8 | 16.6 | 25.9 | |
| 10 | 14.3 | 19.5 | 34.8 | |

[1] As measured by the rate of consumption of alkali by 125 g. peel or pomace in 1500 ml. of water at 25° C. and at pH 7.

Table III indicates that oranges, grapefruit and lemons contain about the same ratio of enzyme to pectin, since the rate of reaction is nearly the same for each fruit in the early stages of the reaction. The grapefruit and lemon peel used in the experiments from which the data in Table III were obtained contained more pectin than the orange peel used, which accounts for the fact that in the case of the orange peel the high rate of reaction did not continue for as long a period of time.

It appears from the results obtained with apple pomace that apples either contain a smaller quantity of enzyme or that the enzyme is partially removed from the field of action by the presence of other substances, such as tannins.

The effect of heat on the stability of the enzyme is shown in Table IV. The comparison is between unheated orange peel and orange peel steam-blanched for 5 minutes. In each case the tests were conducted with 500 g. of orange peel—blanched or unblanched—in 1500 ml. of water at 25° C. and a pH of 9.

TABLE IV

*Effect of blanching on rate of demethoxylation*

| Ml. of 0.5 N-Alkali | Rate of consumption of alkali in minutes | |
|---|---|---|
| | Unblanched | Blanched |
| 10 | 0.6 | 35 |
| 20 | 1.3 | 87 |
| 30 | 2.3 | 123 |

The extraction process is also affected by a number of variables. Table V below shows the effect of the source material, amount of sodium hexametaphosphate, and temperature on the yield of pectinate obtained.

TABLE V

| Source Material | | pH | Sodium hexametaphosphate, grams | Temp., °C. | Yield of Pectinate in grams | | |
|---|---|---|---|---|---|---|---|
| Kind of peel [1] | Weight in 1500 ml. water | | | | 15 min. | 30 min. | 60 min. |
| | Grams | | | | | | |
| Orange | 500 | 3 | 1 | 95 | 1 | | |
| | | | 3 | 95 | 4 | | |
| | | | 6 | 25 | | | 5 |
| | | | 6 | 70 | 6 | | |
| | | | 6 | 95 | 9 | 11 | 14 |
| | | | 9 | 95 | 10 | | |
| | | | 10 | 95 | 10 | | |
| | | | 15 | 95 | 16 | 15 | 17 |
| Grapefruit | 500 | 3 | 2 | 95 | 3 | | |
| | | | 4 | 95 | 7 | | |
| | | | 5 | 95 | 11 | | |
| | | | 15 | 95 | 21 | 19 | 22 |
| Lemon | 500 | 3 | 3 | 95 | 6 | | |
| | | | 4 | 95 | 8 | | |
| | | | 5 | 95 | 9 | | |

[1] Disintegrated peel partially demethoxylated at a pH of 8 for 5 minutes, and then blanched, blended and extracted.

The nature of the product obtained can be controlled to some extent by the procedure used during demethoxylation and extraction. This is illustrated by Tables VI and VII below, which show the effect of the pH maintained during demethoxylation and of varying extraction procedure on the viscosity of the product obtained. The viscosity measurements were made with one-percent solutions of the products at 25° C. and pH 7 in a Stormer viscosimeter.

TABLE VI

*Effect of pH maintained during demethoxylation on viscosity of product*

| Product from peel of— | Conditions of demethoxylation | | | Yield g. per 500 g. | MeO, Per Cent | $n$ centipoises |
|---|---|---|---|---|---|---|
| | pH | Time, min. | Temp., °C. | | | |
| Orange | 6 | 101 | 25 | 8 | 2.9 | 23 |
| | 8 | 4.8 | 25 | 10 | 3.1 | 31 |
| | 9 | 4.2 | 25 | 10 | 2.7 | 33 |

TABLE VII

*Effect of extraction procedure on viscosity of product* [1]

| pH | Temp., °C. | Time, min. | Sodium hexametaphosphate g./500 g. peel | $n$ centipoises |
|---|---|---|---|---|
| 2 | 95-98 | 15 | 15 | 11 |
| 3 | 95-98 | 60 | 15 | 13 |
| 3 | 95-98 | 30 | 15 | 16 |
| 3 | 95-98 | 15 | 15 | 13 |
| 3 | 95-98 | 15 | 6 | 28 |
| 3 | 95-98 | 30 | 6 | 23 |
| 3 | 95-98 | 60 | 6 | 16 |
| 3 | 25 | 60 | 6 | 21 |
| 6 | 95-98 | 15 | 6 | 7 |
| 6 | 70 | 20 | 6 | 18 |
| 6 | 25 | 60 | 6 | 36 |

[1] In each case the demethoxylation was performed on orange peel at a pH of 8.

Our invention is not limited to the pectin source materials used as illustrations in the examples and tabulated data set forth above, but is applicable generally to pectin-containing materials, such as carrots, pea hulls, sugar beets, quinces, grapes, and so forth. Nor is our invention limited to products of a specified methoxyl content. Pectinic acids may be prepared by the methods disclosed herein ranging in methoxyl content from that of pectic acid (provided an alkaline extraction medium is used) to the methoxyl content of the pectin in the pectin-containing source material.

Having thus described our invention, we claim:

1. The process of preparing pectinic acids of low methoxyl content which comprises subjecting an aqueous dispersion of citrus peel to partial de-methoxylation by enzymic hydrolysis, said hydrolysis being attained by adding an alkali to the dispersion and maintaining the dispersion at a pH of 6 to 10 and a temperature of 0° C. to 60° C. until the low-methoxyl pectinic acids are formed the enzymic demethoxylation being in the presence of a small amount of sodium hexametaphosphate.

2. The process according to claim 1 wherein the pH is maintained at 8 to 10 and the temperature from 35° C. to 45° C.

3. The process of partially demethoxylating pectin which comprises forming an aqueous dispersion at a temperature of about 0° to 60° C. of citrus peel, adjusting the dispersion to a pH of 6 to 10 with alkali solution, adding additional alkali solution at a rate which will maintain the pH within the range from 6 to 10 until the amount of alkali necessary to obtain the desired degree of demethoxylation has been added, the demethoxylation being in the presence of a small amount of sodium hexametaphosphate, then rapidly acidifying the dispersion with a strong acid and quickly heating to boiling to destroy the catalysts present.

4. The process described in claim 3 in which the pectinic acid formed is extracted from the acidic dispersion containing sodium hexametaphosphate.

HARRY S. OWENS.
WILLIAM DAYTON MACLAY.

REFERENCES CITED

The following references are of record in the file of this patent:

UNITED STATES PATENTS

| Number | Name | Date |
|---|---|---|
| Re. 21,077 | Wilson | May 9, 1939 |
| 1,513,615 | Leo | Oct. 28, 1924 |
| 2,132,065 | Wilson | Oct. 4, 1938 |
| 2,133,273 | Cox | Oct. 18, 1938 |
| 2,349,138 | Bryant | May 16, 1944 |
| 2,358,430 | Willaman | Sept. 19, 1944 |

FOREIGN PATENTS

| Number | Country | Date |
|---|---|---|
| 541,528 | Great Britain | Dec. 1, 1941 |